United States Patent [19]
Ahn

[11] Patent Number: 5,834,047
[45] Date of Patent: Nov. 10, 1998

[54] METHOD FOR IMPRINTING CONFECTIONERY PRODUCTS WITH EDIBLE INK

[76] Inventor: Sung-Ae Ahn, 1-303, Jangmi 3rd Apartment, Shincheon-dong, Songpa-ku, Seoul, Rep. of Korea

[21] Appl. No.: 661,032

[22] Filed: Jun. 10, 1996

[51] Int. Cl.$^6$ .................................................. A23L 1/27
[52] U.S. Cl. ........................ 426/383; 426/89; 426/104; 426/103; 426/302; 426/512
[58] Field of Search ............... 426/87, 104, 249, 426/250, 302, 103, 383, 512, 89

[56] References Cited

U.S. PATENT DOCUMENTS

| | | | |
|---|---|---|---|
| 3,852,494 | 12/1974 | Williamson | 426/383 |
| 3,910,183 | 10/1975 | Noren et al. | 101/41 |
| 4,578,273 | 3/1986 | Krubert | 426/82 |
| 5,142,976 | 9/1992 | Roulleau | 101/41 |

FOREIGN PATENT DOCUMENTS

| | | |
|---|---|---|
| 0 447 733 | 9/1991 | European Pat. Off. . |
| 0 462 093 | 12/1991 | European Pat. Off. . |
| 47-16093 | 5/1972 | Japan . |
| 59-130137 | 7/1984 | Japan . |
| 62-36151 | 2/1987 | Japan . |
| 1-50376 | 10/1989 | Japan . |
| 2-92241 | 4/1990 | Japan . |
| 772851 | 2/1955 | United Kingdom . |
| 838948 | 6/1960 | United Kingdom . |

*Primary Examiner*—Milton Cano
*Attorney, Agent, or Firm*—McAulay Nissen Goldberg Kiel & Hand, LLP

[57] ABSTRACT

The present invention relates to a method of imprinting diverse shapes of multiple colors inside the confectionery products with edible ink. According to the present invention, a liquified mixture of confectionery material is partially filled and solidified in a plurality of molds. A plurality of etching plates, which have been partially perforated along the predetermined shape and according to the number of predetermined colors, are mounted on the surface of the solidified mixture. Edible ink of predetermined colors is dispersed by turns on the plurality of said etched plates, and the remaining portion of the liquified mixture is filled and solidified in the plurality of molds.

6 Claims, 4 Drawing Sheets

METHOD FOR IMPRINTING CONFECTIONERY PRODUCTS WITH EDIBLE INK

BACKGROUND OF THE INVENTION

1. Field of the Invention

The present invention relates to a method and apparatus for imprinting confectionery products with edible ink, more particularly to a method and apparatus for imprinting confectionery products, such as candies, pastries, etc., in various shapes, i.e., signs, letters or designs, by utilizing edible ink so that the imprinted shape clearly remains until each confectionery product is completely consumed.

2. Description of the Prior Art

Confectionery products, generally having a sweet taste, provide energizing effects combined with diverse flavors such as coffee, peppermint, or fruit flavors. For this reason, confectionery products are favored not only by children but also by adults. In recent years, a variety of confectionery products having effects such as eliminating oral odor, suppressing sleepiness, etc. have been developed. Such confectionery products are manufactured in diverse forms, such as in transparent form, in peculiar colors or shapes, to draw or attract consumers' visual attention as well as to heighten product values.

Due to the limited ability of imprinting shapes onto the confectionery products per se, confectionery manufacturers normally employ methods of printing diverse shapes on either packages or cases of the confectionery products. In this case, however, the printed shapes can no longer be seen by the consumers once the packages or cases are opened. Imprinting of diverse shapes such as human being, animals, or cartoons favored by consumers inside the confectionery products is expected to significantly contribute to promoting sales of confectionery products. For this reason, a great deal of research has been performed to find a method of imprinting desired shapes inside the confectionery products. Japanese Laid-Open Patent No. 60-174868 and European Patent No. 0,462,093 are notable examples.

In Japanese Laid-Open Patent No. 60-174868, a liquified mixture of confectionery materials is first injected into half of a mold and then solidified. Then, an edible film on which a predetermined shape has been printed in a predetermined color with food dye is deposited on the solidified surface. A liquified mixture of confectionery material is once again injected on the film layer and then solidified. After elapse of a predetermined time, the solidified product is removed from the mold. In the process, one side of the product is manufactured in transparent form.

This method disclosed in the Japanese patent resolved the problem of imprinting desired shapes in diverse colors. However, it still carries a drawback of imposing a heterogeneous taste of edible film layered within the confectionery product while it is consumed. Also, depositing edible film through a separate manufacturing process increases manufacturing costs. Further, the edibile film layered within the confectionery products has low intensity when manufactured by that method. Thus the confectionery products become vulnerable to impacts which frequently occur during transportation or in careless treatment of the products. The edible film layer is an anticipated base point of cracking in that case as well as when the film is exposed while the product is consumed. To avoid the anticipated cracks of the confectionery products, the thinnest possible films must be disclosed in the Japanese Patent.

European Patent No. 0,462,903 relates to a method of imprinting confectionery products by employing filing means for filing edible ink, such as chocolate, in an etched plate according to a predetermined shape; a transferring edible ink in the predetermined shape for imprinting; conveying means for pressing the etched plate covered with the transferring pad and removing the pad from the etched plate; and imprinting means for imprinting a desired shape directly or indirectly on the confectionery products.

The technique disclosed in the said European patent relates to a method of imprinting desired shapes either directly on a shaped pad covered on the confectionery product or by shaping the confectionery products in a mold, on which an inked pad is first covered for printing the shape. This technique achieves the imprinting of the desired shapes on the surfaces of the confectionery products. However, the product fails to retain its desired shape during consumption. It is required under this method to use an ink scooper to spread edible ink throughout the etched shape of the plate as well as a blade to equally disperse the ink within the shape. If multiple color ink is used in this process, the colors can easily be mixed up because of the blade movement. Accordingly, this technique is available only for imprinting the confectionery products in a single color.

SUMMARY OF THE INVENTION

The object of the present invention is to resolve such chronic problems as described above. In other words, the object of the present invention is to provide a method and apparatus of imprinting desired shapes in different colored edible ink inside the confectionery products so that the imprinted shape is maintained until the product is completely consumed.

To achieve such an object, the present invention provides a method of imprinting inside the confectionery products with edible ink,, the method comprising the steps of:

partly filling and solidifying a liquified mixture of confectionery materials in a plurality of molds;

mounting a plurality of etched plates, which have been partially perforated in line with a predetermined shape, on the solidified surface;

dispersing edible ink of predetermined colors on the plurality of etched plates; and filling and solidifying a liquified mixture of confectionery materials in the remaining parts of the molds.

The edible ink employed in this method is available for variation of colors, such as original colors or mixed colors, irrespective of the different styles of colors or preciseness of printing. Diverse colors are available by controlling the mixing ratio and tones. However, desirable viscosity should be maintained for high reproduction of desired colors. The desirable weight ratios to satisfy such conditions are 1–30 wt % for food dye, 1–30 wt % for purified water, 1–50 wt % for oxide titanium, and 40–98 wt % for liquified sugar.

The viscosity of the liquified sugar is a significant element for smoothing the printing. A low viscosity of the liquified sugar under 50 Brix inhibits the edible ink from adhering to the printing surface of the confectionery products. On the contrary, a high viscosity of the liquified sugar above 90 Brix prevents smooth injection of the edible ink. Accordingly, the desirable viscosity of the liquified sugar should be maintained within the range of 50–90 Brix.

To achieve this object, the present invention also provides an apparatus of imprinting the confectionery products with edible ink, an apparatus comprising:

a plurality of molding means consecutively arranged at predetermined intervals for solidifying the liquified mixture of confectionery materials;

first filling means for partially filling the solidified mixture of the confectionery materials in the molding means by turns;

a plurality of imprinting means for dispersing edible ink with desired colors on the solidified mixture of the confectionery materials under the predetermined internal pressure;

a plurality of etching means partially perforated along the predetermined shape and mounted at the respective bottoms of the plurality of imprinting apparatus;

rotating means for arranging the plurality of imprinting means at predetermined intervals along the circumference of the rotating means and rotating with a predetermined rotating cycle;

second filling means for filling the liquified mixture of confectionery materials in the remaining parts of the plurality of molds around which the imprinting means have rotated; and conveying means for conveying the plurality of molds to the first filling means, imprinting means and second filling means by turns at predetermined time intervals.

The imprinting means is an apparatus comprising a cylindrical vacuum tank mounted on the etched plate. A dispersing nozzle and air-valve are mounted on the upper part of the tank, while a heater is mounted on the circumferential surface of the lower part of the tank.

The rotating means rotating the imprinting means around the circumferential surface of the pivot enables multiple coloring in turn while imprinting. In other words, the conveying means conveys a plurality of molds filled in by the mixture of confectionery materials to the lower part of the imprinting means. If the first imprinting is completed, a rotating plate comprising a plurality of imprinting means is rotated at a predetermined angle for a second imprinting. An ultimately desired shape in multiple colors can be printed by repeatedly performing the same process.

Employing an imprinting means according to the present invention not only enables performing multiple imprinting steps in narrow space but also reduces the entire imprinting time owing to the conveyance of the molds by conveying means in the horizontal direction as well as the rotating movement of the imprinting means generated by the rotating means.

DETAILED EXPLANATION OF THE PREFERRED EMBODIMENTS

The imprinting steps and construction as well as the working effect of the present invention can be explained in detail with reference to the attached drawings.

Figure 1:
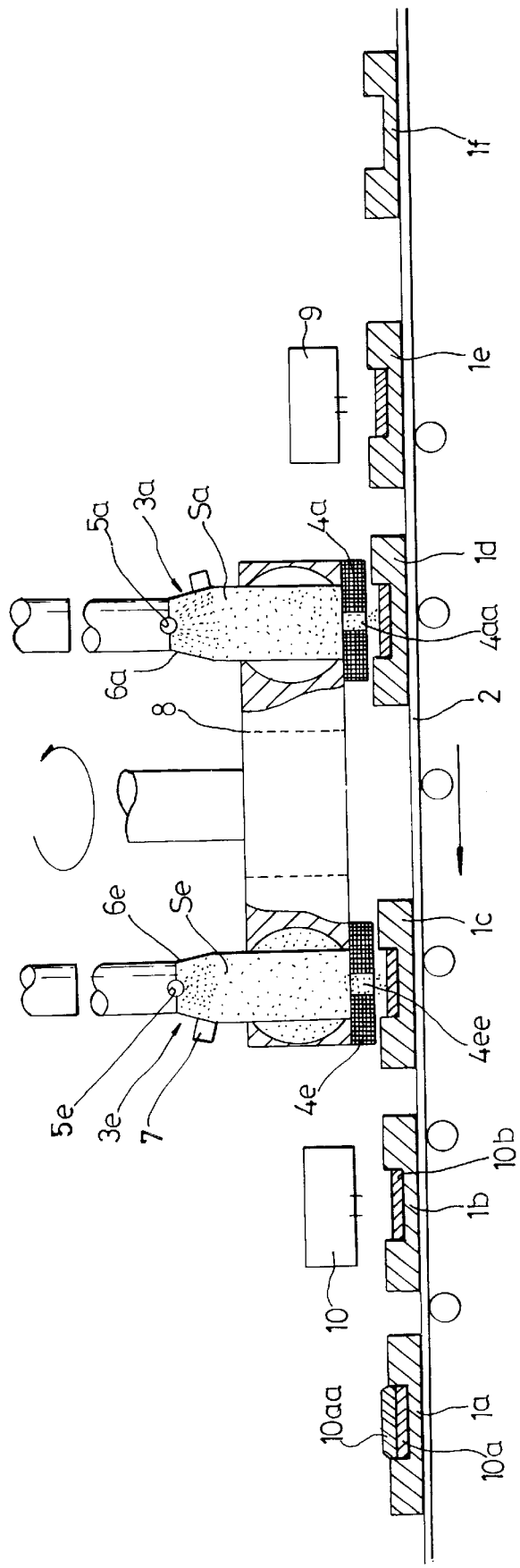
FIG. 1 is a side cross-sectional view of the imprinting apparatus according to the present invention.

FIG. 1 is a side cross-sectional view of the imprinting apparatus according to the present invention.

Figure 2:
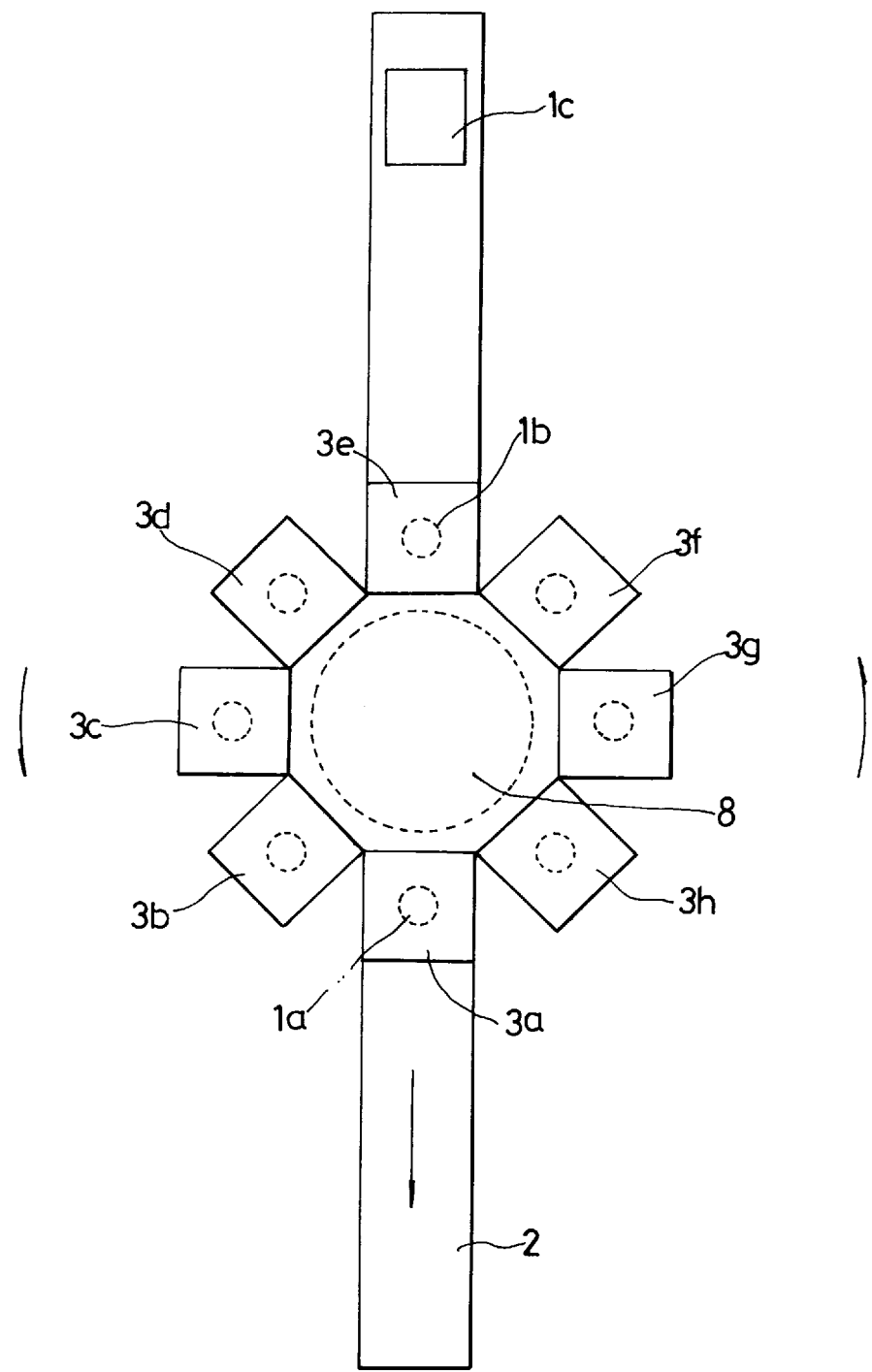
FIG. 2 is a front view of imprinting apparatus according to the present invention.

FIG. 2 is a front view of imprinting apparatus according to the present invention.

A liquified mixture of confectionery material is first prepared for the manufacturing of confectionery products. The liquified mixture of confectionery materials here means the mixture of confectionery materials mixed and condensed with the same mixing ratio as general liquified mixtures of confectionery materials. Additives such as lactose, flavor and food dye are added to the condensed mixture. Table 1 is a diagram showing components of a candy mixture according to a preferred embodiment of the present invention.

TABLE 1

| components | white sugar | glucose | lactose | flavor | food dye | total |
| --- | --- | --- | --- | --- | --- | --- |
| ratio (%) | 59.20 | 39.40 | 1.00 | 0.32 | 0.01 | 100.00 |

The mixing ratio for a candy mixture may be variously controlled depending on the nature of the candy.

The edible ink is manufactured by mixing food dye of 1–30 wt %, purified water of 1–30 wt %, oxide titanium of 1–50 wt % and liquified mixture of confectionery materials of 40–98 wt %.

FIG. 1 illustrates an imprinting apparatus according to the present invention in which a candy mixture and edible ink are prepared.

After preparing the liquified mixture, a plurality of molds $1a$–$1f$ are then consecutively arranged at predetermined intervals on the conveying means 2 to solidify the candy mixture (FIG. 1 showing the preferred embodiment of the present invention illustrate only six molds). The conveying means 2 consecutively conveys the molds $1a$–$1f$ at a predetermined distance and time intervals. If conveying means 2 operates, the molds $1a$, $1b$ are conveyed to the lower part of the first filling means 9. The first filling means first fill 40–60% of the entire candy mixture in the molds $1a$, $1b$ by turns, and evenly spread the candy mixture to the bottom of the molds $1a$, $1b$. The firstly filled-in candy mixture $10a$, $10b$ are then solidified in a cooling process employing cool air.

After elapse of a predetermined time, the conveying means 2 operates again, thereby the molds $1a$, $1b$ with solidified candy mixture $10a$, $10b$ inside are respectively conveyed to the lower part of the imprinting means $3a$, $3e$, which are mounted around the circumferential surface of the rotating plate 8 as shown in FIG. 2. Instantaneously, the molds $1c$, $1d$ are automatically conveyed to the lower part of the first filling means 9.

The first filling means 9 fills the candy mixture in the molds $1c$, $1d$, while the imprinting means $3a$, $3e$ respectively imprint another part of the identical shape on the surface of the molds $1a$, $1b$. This process may be repeatedly performed more than once depending on the desired shape and color. It is repeated four times in the preferred embodiment of the present invention.

FIG. 2 illustrates a total of eight imprinting means according to the present invention. The number of the imprinting means and colors of ink may be varied depending on the desired shape and color tones. Etching plates $4a$–$4h$ in which dispersing holes $4aa$–$4hh$ have been perforated along the desired shape are mounted on the lower parts of the eight imprinting means $3a$–$3h$ as shown in FIG. 1. The etching plates $4a$–$4h$ are manufactured by taking the steps of taking a photo of the desired shape; preparing a plurality of plates according to the number of colors; manufacturing etched films; and perforating dispersing holes $4aa$–$4hh$ on the etched films. In other words, the required number of etched plates depends on the number of desired colors.

Ink tanks $6a$–$6h$ containing edible ink of desired colors are mounted on the eight imprinting means $3a$–$3h$. The edible ink S provided for the imprinting means 3a–3h is injected into the ink tanks 6a–6h by the desiring nozzle 5. The edible ink injected into the ink tanks 6a–6h under the pressure of the air blown through the air value 7 is dispersed on the surface of the solidified candy mixture through the dispersing holes 4aa–4hh of the etched plates 4a–4h.

Figure 3A:
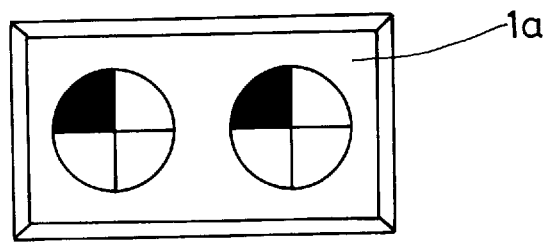
FIGS. 3A through 3D are top plan views illustrating the imprinting steps according to the present invention.
Figure 3B:
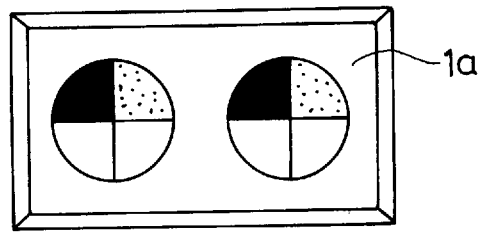
Figure 3C:
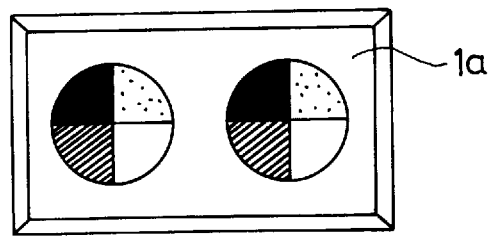
Figure 3D:
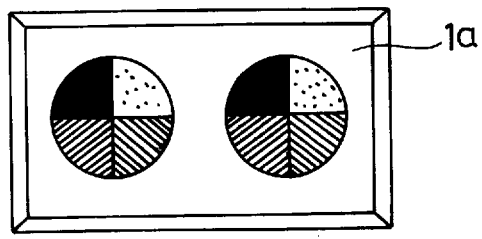

In this imprinting step, a pair of imprinting means 3a, 3e imprint a part of the desired shape in one color in the molds 1a, 1b, as shown in FIG. 3A. If the rotating plate 8 rotates in a counter-clockwise direction at an angle of 45° with no movement of the molds 1a, 1b, the imprinting means 3b, 3f are respectively mounted on the upper parts of the molds 1a, 1b. Imprinting is then performed in another part of the shape with a different color as shown in FIG. 3B. After performance of the second imprinting, the rotating plate 8 rotates in a counter-clockwise direction at the angle of 45° with no movement of the molds 1a, 1b, and the imprinting means 3c, 3g are mounted on the upper parts of the molds 1a, 1b. Imprinting is once again performed for another part of the shape with another color. After performance of the third imprinting, the rotating plate rotates in a counter-clockwise direction at an angle of 45° with no movement of the molds 1a, 1b, and the imprinting means 3d, 3g are mounted on the upper parts of the molds 1a, 1b. Imprinting is once again performed for another part of the shape with another color. An entire shape with four different colors is ultimately imprinted on the surface of the candy mixture 10a, 10b by the rotating plate rotating a total of four times at an angle of 45°. The rotating cycle of the rotating plate, which may be varied according to the desired shape and number of colors, is preferably defined with an angle of $360/2^n$ and the rotating number of $180/(360/2^n)$. $2^n$ represents the entire number of imprinting means.

After completion of the above imprinting steps, the rotating plate 8 rotates to discharge the imprinting means from its left side to the upper parts of the molds for an additional imprinting. A desired shape can be imprinted in multiple colors by repeating such cyclic steps.

After completion of the entire imprinting process, the conveying means is operated to convey the molds 1a, 1b to the lower part of the second filling means 11, in which the remaining candy mixture 10aa is to be filled. The molds 1c, 1d shaping the solidified candy mixture 10c, 10d are simultaneously conveyed to the lower parts of the imprinting means 3a, 3e, respectively. The molds 1e, 1f are automatically conveyed to the lower part of the first filling means 9. After elapse of a predetermined time, the imprinted candy mixture 10a, 10aa are conveyed to undergo a packing process. The same cyclic steps are repeated in the meantime in the manner as described above. Thus, a bulk of candies bearing a predetermined shape can be produced by employing a unified process of dispersing edible ink of multiple colors into the candy mixture.

FIGS. 4A to 4E are diagrams illustrating the imprinting process according to the present invention.

Figure 4A:
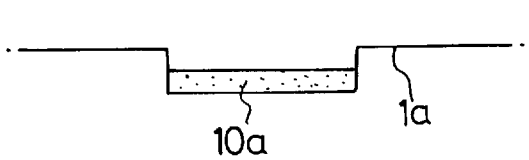
FIGS. 4A through 4E are block diagrams showing the imprinting method according to the present invention.

Edible ink and a candy mixture are prepared to perform the imprinting method according to the present invention. The candy mixture is filled in half of the molds 1a–1f, as shown in FIG. 4A.

Figure 4B:
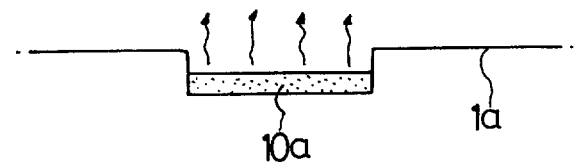

The filled-in candy mixture is then cooled and solidified, as shown in FIG. 4B. The cooling process may be performed under an atmospheric pressure. To reduce the time for solidification, however, it is desirable to actively cool the mixture with cool air.

Figure 4C:
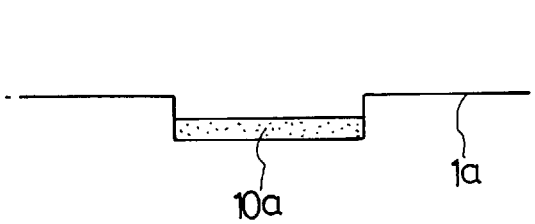
Figure 4D:
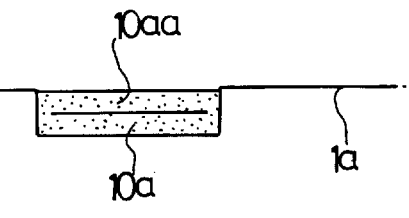

An imprinting apparatus comprising a plurality of etched plates, which have been perforated along the partial lines of a desired shape, and food dye are rotated with a rotating cycle with a predetermined angle and number of times, as shown in FIG. 4C, to disperse edible ink more than once with different colors on the surface of the solidified candy mixture. This imprinting step is preceded by manufacturing etched plates 4a–4h that have holes 4aa–4hh perforated along the partial lines of the desired shape and are mounted on the lower parts of the imprinting means 3a–3h, in which edible ink S of multiple colors has been injected into the ink tanks 6a–6h. The imprinting is performed by dispersing the edible ink under a predetermined internal pressure of the ink tanks 6a–6h.

Figure 4E:
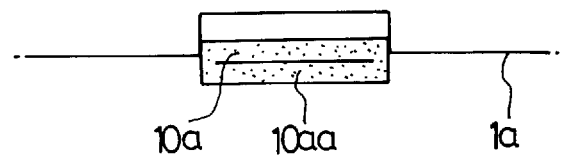

The rotating cycle, which may be varied according to the shape and number of the desired colors, is preferably defined by an angle of $360/2^n$ and a rotating number of $180/(360/2^n)$. $2^2$ represents the entire number of imprinting means. The rotating cycle of eight imprinting apparatus in the present invention is therefore four-time's rotation at an angle of 45°. After completion of the imprinting on the candy mixture, the remaining candy mixture is filled to the top of the mold, as shown in FIG. 4A. The candy mixture is then solidified by the cooling method as shown in FIG. 4B. A holder made of wood or plastic may be stuck or inserted before the remaining candy mixture is filled in the mold. The solidified candy mixture is then removed from the mold 1a, as shown in FIG. 4E.

The imprinting method and apparatus according to the present invention may be applied to imprinting both transparent and opaque confectionery products.

As described above, the present invention provides a method and apparatus of imprinting diverse shapes, such as signs, letters or designs, in multiple colors inside the confectionery products. The confectionery products manufactured by means of the present invention not only retain the imprinted shape until complete consumption of the products but are also impact-resistant, unlike those imprinted by employing edible films.

What is claimed is:

1. A method of imprinting desired shapes inside a confectionery product comprising the steps of:

a) partially filling and solidifying a liquefied mixture of confectionery material in a plurality of molds;

b) mounting a plurality of etched plates which have been partially perforated along a desired shape and according to a number of predetermined colors on an exposed surface of the solidified mixture in the partially filled molds;

c) dispersing and imprinting an edible ink of the predetermined colors onto the surface of the solidified mixture by turns on the mounted etched plate; and d) filling the remaining space in the plurality of molds by overlaying the imprinted ink with an additional liquefied mixture of confectionery materials and solidifying the additional liquefied mixture of confectionery material.

2. A method of imprinting confectionery products with edible ink as claimed in claim 1, wherein said method further comprises the steps of:

manufacturing a plurality of etched plates having holes perforated partially or completely along the lines of the predetermined shape according to the number of determined colors;

injecting edible ink of predetermined colors into a plurality of ink containing means; and dispersing said edible ink on said plurality of etching plates under a predetermined internal pressure of said ink containing means.

3. A method of imprinting confectionery products with edible ink as claimed in claim 1, wherein said solidifying of confectionery materials is performed using cool air.

4. A method of imprinting confectionery products with edible ink as claimed in claim 1, wherein said solidifying includes a step of sticking a holder inside said mixture of confectionery materials.

5. A method of imprinting confectionery products with edible ink as claimed in claim 1, wherein the weight quantity ratios of said edible ink comprise 1–30 wt % of liquified sugar.

6. A method of imprinting confectionery products with edible ink as claimed in claim 5, wherein the viscosity of said liquified sugar is maintained within the range of 50–90 Brix.

* * * * *